United States Patent
Hammond et al.

(10) Patent No.: US 11,280,961 B1
(45) Date of Patent: Mar. 22, 2022

(54) OPTICAL POWER SPLITTERS WITH SIDE-CONFINING ELEMENTS

(71) Applicant: GLOBALFOUNDRIES U.S. Inc., Santa Clara, CA (US)

(72) Inventors: Alec Hammond, Atlanta, GA (US); Yusheng Bian, Ballston Lake, NY (US); Michal Rakowski, Ballston Lake, NY (US); Won Suk Lee, Malta, NY (US); Asif J. Chowdhury, Clifton Park, NY (US); Roderick A. Augur, Saratoga Springs, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 17/113,567

(22) Filed: Dec. 7, 2020

(51) Int. Cl.
*G02B 6/125* (2006.01)
*G02B 6/12* (2006.01)

(52) U.S. Cl.
CPC ......... *G02B 6/125* (2013.01); *G02B 6/12007* (2013.01); *G02B 2006/1215* (2013.01)

(58) Field of Classification Search
None
See application file for complete search history.

(56) References Cited

U.S. PATENT DOCUMENTS

| | | | | |
|---|---|---|---|---|
| 6,236,784 B1 * | 5/2001 | Ido | ........................ | G02B 6/125 385/39 |
| 2006/0115200 A1 * | 6/2006 | Van Der Vliet | ..... | G02B 6/2813 385/12 |
| 2006/0204175 A1 * | 9/2006 | Laurent-Lund | ........ | G02B 6/136 385/43 |
| 2014/0178005 A1 * | 6/2014 | Zhang | ................... | G06F 30/394 385/45 |
| 2018/0164506 A1 * | 6/2018 | Painchaud | ......... | G01B 9/02097 |

OTHER PUBLICATIONS

Yi Zhang, Shuyu Yang, Andy Eu-Jin Lim, Guo-Qiang Lo, Christophe Galland, Tom Baehr-Jones, and Michael Hochberg, "A compact and low loss Y-junction for submicron silicon waveguide," Opt. Express 21, 1310-1316 (2013).

Weijie Chang, Xinshu Ren, Yingquan Ao, Longhui Lu, Mengfan Cheng, Lei Deng, Deming Liu, and Minming Zhang, "Inverse design and demonstration of an ultracompact broadband dual-mode 3 dB power splitter," Opt. Express 26, 24135-24144(2018).

Christopher M. Lalau-Keraly, Samarth Bhargava, Owen D. Miller, and Eli Yablonovitch, "Adjoint shape optimization applied to electromagnetic design," Opt Express 21, 21693-21701 (2013).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Wanqin Zhong and Jinbiao Xiao, "Ultracompact polarization-insensitive power splitter using subwavelength-grating-based MMI couplers on an SOI platform," Appl. Opt. 59, 1991-1997 (2020).

* cited by examiner

*Primary Examiner* — Chad H Smith
(74) *Attorney, Agent, or Firm* — Thompson Hine LLP; Anthony Canale

(57) ABSTRACT

Structures for an optical power splitter and methods of forming a structure for an optical power splitter. A splitter body defines a multimode interference region of the optical power splitter. A first side element positioned adjacent to a first side surface of the splitter body, and a second side element positioned adjacent to a second side surface of the splitter body.

20 Claims, 3 Drawing Sheets

OPTICAL POWER SPLITTERS WITH SIDE-CONFINING ELEMENTS

BACKGROUND

The present invention relates to photonics chips and, more specifically, to structures for an optical power splitter and methods of forming a structure for an optical power splitter.

Photonics chips are used in many applications and systems, such as data communication systems and data computation systems. A photonics chip integrates optical components, such as waveguides, optical switches, optical power splitters, and directional couplers, and electronic components, such as field-effect transistors, into a unified platform. Among other factors, layout area, cost, and operational overhead may be reduced by the integration of both types of components on the same chip.

An optical power splitter is an optical component that is used in photonics chips to divide optical power between multiple waveguides with a desired coupling ratio. The same structure may be used as an optical power combiner that combines optical power received from multiple waveguides. Conventional optical power splitters tend to have a footprint that is larger than desirable and, in addition, may exhibit an intolerance to fabrication variations.

Improved structures for an optical power splitter and methods of forming a structure for an optical power splitter are needed.

SUMMARY

In an embodiment of the invention, a structure for an optical power splitter is provided. The structure includes a splitter body defining a multimode interference region of the optical power splitter, a first side element positioned adjacent to a first side surface of the splitter body, and a second side element positioned adjacent to a second side surface of the splitter body.

In an embodiment of the invention, a method of forming a structure for an optical power splitter is provided. The method includes forming a splitter body defining a multimode interference region of the optical power splitter, forming a first side element positioned adjacent to a first side surface of the splitter body, and forming a second side element positioned adjacent to a second side surface of the splitter body.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
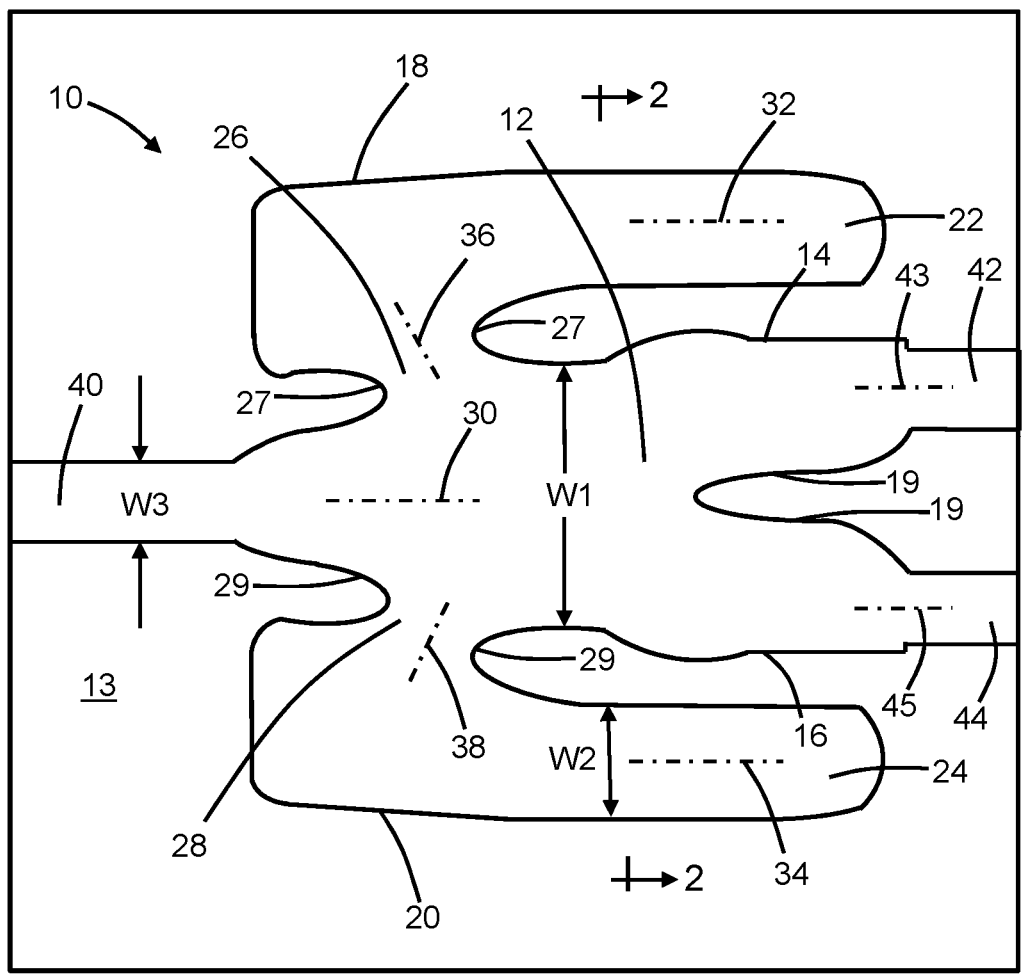
FIG. 1 is a top view of a structure at an initial fabrication stage of a processing method in accordance with embodiments of the invention.
Figure 2:
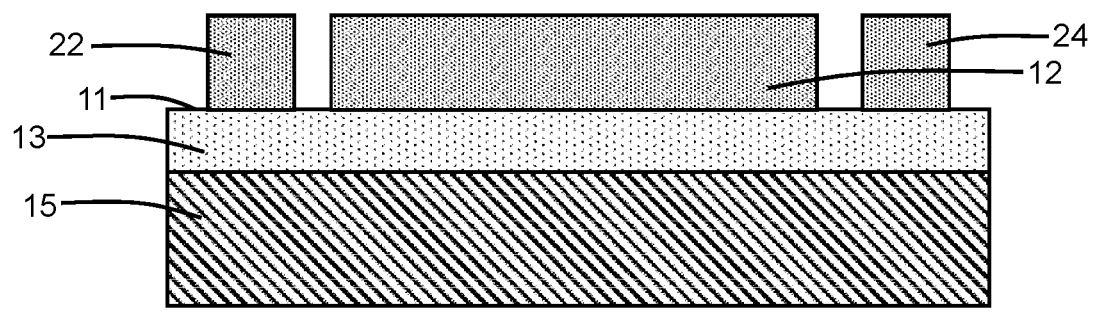
FIG. 2 is a cross-sectional view taken generally along line 2-2 in FIG. 1.

With reference to FIGS. 1, 2 and in accordance with embodiments of the invention, a structure 10 for a multimode optical power splitter includes a splitter core or splitter body 12 that is positioned on a top surface 11 of a dielectric layer 13. The splitter body 12 includes a portion that is physically and optically coupled to an input waveguide core 40 on an input side of the structure 10. The splitter body 12 further includes respective portions that are physically and optically coupled to an output waveguide core 42 and an output waveguide core 44 on an output side of the structure 10.

The splitter body 12 may define a multimode interference region of the structure 10 that enables optical power splitting. The splitter body 12 includes opposite side surfaces 14, 16 that may increase in lateral separation with increasing distance from the input waveguide core 40 over at least a portion of the length of the splitter body 12. The portion of the splitter body 12 that is physically and optically coupled to the output waveguide core 42 is spaced longitudinally along a longitudinal axis 30 of the splitter body 12 from the portions of the splitter body 12 that are physically and optically coupled to the output waveguide cores 42, 44.

In an embodiment, the portions of the splitter body 12 that are physically and optically coupled to the output waveguide cores 42, 44 may be symmetrically arranged relative to the portion of the splitter body 12 that is physically and optically coupled to the input waveguide core 40. The symmetrical arrangement may provide a 3 dB optical splitter in which the optical power of the laser light may be split equally or substantially equally by the structure 10. In an alternative embodiment, the portions of the splitter body 12 that are coupled to the output waveguide cores 42, 44 may be asymmetrically arranged relative to the portion of the splitter body 12 that is coupled to the input waveguide core 40. The asymmetrical arrangement may provide the structure 10 with a coupling ratio that differs from an equal or substantially equal split.

The splitter body 12 may have a non-rectangular geometrical shape, and the side surfaces 14, 16 may include curved portions that provide the non-rectangular geometrical shape with rounded corners. The splitter body 12 further includes curved side surfaces 19 that intersect at a cusp to define a concavity that curves or bends inward and that is laterally positioned in the splitter body 12 between the output waveguide cores 42, 44. The concavity defined by the curved side surfaces 19 of the splitter body 12 may be aligned along the longitudinal axis 30 with the portion of the splitter body 12 to which the input waveguide core 40 is physically and optically coupled.

The structure 10 further includes a side element 22 that is physically coupled by a bridge 26 with the splitter body 12 and a side element 24 that is physically coupled by a bridge 28 with the splitter body 12. The side elements 22, 24 are not directly coupled with either of the output waveguide cores 40, 42. The splitter body 12 is laterally positioned in a direction transverse to its longitudinal axis 30 between the side element 22 and the side element 24. The side element 22 may have a non-rectangular geometrical shape, and the side element 22 may include a side surface 18 extending about its perimeter. The side surface 18 provides the non-rectangular geometrical shape with rounded corners and includes curved portions that contribute to the non-rectangular geometrical shape of the side element 22. Similarly, the side element 24 may have a non-rectangular geometrical shape, and the side element 24 may include a side surface 20 extending about its perimeter. The side surface 20 provides the non-rectangular geometrical shape with rounded corners and includes curved portions that contribute to the non-rectangular geometrical shape of the side element 24.

The bridge 26 is physically coupled to a portion of the splitter body 12 and to a portion of the side element 22 to provide a linkage between the splitter body 12 and the side element 22. The bridge 28 is physically coupled to a portion of the splitter body 12 and to a portion of the side element 24 to provide a linkage between the splitter body 12 and the side element 24. The bridges 26, 28 may be located relative to the splitter body 12 and side elements 22, 24 such that the bridges 26, 28 are positioned closer to the input waveguide core 40 than to the output waveguide cores 42, 44. The bridge 26 is contoured with side surfaces 27 that are curved to define, on each side edge of the bridge 26, concavities that curve or bend inward. The side surfaces 27 of the bridge 26 extend from the splitter body 12 to the side element 22, and each of the side surfaces 27 intersects both the side surface 14 of the splitter body 12 and the side surface 18 of the side element 22. The bridge 28 is also contoured with side surfaces 29 that are curved to define, on each side edge of the bridge 28, concavities that curve or bend inward. The side surfaces 29 of the bridge 28 extend from the splitter body 12 to the side element 24, and each of the side surfaces 29 intersects both the side surface 16 of the splitter body 12 and the side surface 20 of the side element 24.

The input waveguide core 40 may be aligned with the longitudinal axis 30 of the splitter body 12, and the output waveguide cores 42, 44 may include respective longitudinal axes 43, 45 that are positioned adjacent to, and laterally offset from, the longitudinal axis 30. The side element 22 includes a longitudinal axis 32 that is laterally offset from the longitudinal axis 30. In an embodiment, the longitudinal axis 32 of the side element 22 may be aligned parallel, or substantially parallel, to the longitudinal axis 30 of the splitter body 12. The side element 24 includes a longitudinal axis 34 that is laterally offset from the longitudinal axis 30. In an embodiment, the longitudinal axis 34 of the side element 24 may be aligned parallel, or substantially parallel, to the longitudinal axis 30 of the splitter body 12.

The bridge 26 includes a longitudinal axis 36 that is angled relative to the longitudinal axis 30 of the splitter body 12 and that is also angled relative to the longitudinal axis 32 of the side element 22. In an embodiment, the longitudinal axis 36 of the bridge 26 may be inclined at an angle in a range of 10° to 170° relative to the longitudinal axis 30 and inclined at an angle in a range of 10° to 170° relative to the longitudinal axis 32. In an embodiment, the angles may be equal. In an embodiment, the angles may be unequal. The longitudinal axis 36 may be arranged within a symmetry plane for reflection of the bridge 26.

The bridge 28 includes a longitudinal axis 38 that is angled relative to the longitudinal axis 30 of the splitter body 12 and that is also angled relative to the longitudinal axis 34 of the side element 24. In an embodiment, the longitudinal axis 38 of the bridge 28 may be inclined at an angle in a range of 10° to 170° relative to the longitudinal axis 30 and inclined at an angle in a range of 10° to 170° relative to the longitudinal axis 34. In an embodiment, the angles may be equal. In an embodiment, the angles may be unequal. The longitudinal axis 38 may be arranged within a symmetry plane for reflection of the bridge 28.

The splitter body 12 has a width, W1, that varies with position along the longitudinal axis 30. In an embodiment, the width, W1, may be equal to about 0.5 times to about 2 times the wavelength of the light being split by the structure 10. The side elements 22, 24 have a width, W2, that varies with position along their respective longitudinal axes 32, 34. In an embodiment, the width, W2, may be equal to about 0.1 times to about 0.8 times the wavelength of the light being split by the structure 10. The waveguide cores 40, 42, 44 may have a width, W3, equal to about 0.15 times to about 0.45 times the wavelength of the light being split by the structure 10. The wavelength of the light being split by the structure 10 may be, for example, in a range of 1260 nm to 1360 nm (the O-band).

The bridge 26 may have a dimension in a direction parallel to the longitudinal axis 36, and a dimension in a direction transverse to the longitudinal axis 36. In an embodiment, these orthogonal dimensions of the bridge 26 are each less than the 0.5 times wavelength of the light being split by the structure 10. In an embodiment, these orthogonal dimensions of the bridge 26 may each be equal to about 0.05 times to about 0.5 times the wavelength of the light being split by the structure 10, and the orthogonal dimensions may be either equal or unequal.

The bridge 28 may have a dimension in a direction parallel to the longitudinal axis 38, and a dimension in a direction transverse to the longitudinal axis 38. In an embodiment, these orthogonal dimensions of the bridge 28 are each less than 0.5 times the wavelength of the light being split by the structure 10. In an embodiment, these orthogonal dimensions of the bridge 28 may each be equal to about 0.05 times to about 0.5 times the wavelength of the light being split by the structure 10, and the orthogonal dimensions may be either equal or unequal.

The splitter body 12, side elements 22, 24, bridges 26, 28, and waveguide cores 40, 42, 44 may be comprised of a single-crystal semiconductor material, such as single-crystal silicon. In an embodiment, the single-crystal semiconductor material may originate from a device layer of a silicon-on-insulator (SOI) substrate that further includes a buried oxide layer providing the dielectric layer 13 and a handle substrate 15 comprised of a single-crystal semiconductor material, such as single-crystal silicon. The splitter body 12, side elements 22, 24, bridges 26, 28, and waveguide cores 40, 42, 44 may be patterned from the device layer by lithography and etching processes. The device layer may be fully etched to define the splitter body 12, side elements 22, 24, bridges 26, 28, and waveguide cores 40, 42, 44 or, alternatively, only partially etched to define a thinned residual layer on the dielectric layer 13 and coupled to a lower portion of the splitter body 12, side elements 22, 24, bridges 26, 28, and/or waveguide cores 40, 42, 44. In alternative embodiments, the splitter body 12, side elements 22, 24, bridges 26, 28, and/or waveguide cores 40, 42, 44 may be comprised of a different material, such as a dielectric material like silicon nitride.

The structure 10 providing the optical power splitter may be characterized by a compact footprint in comparison with conventional optical power splitters. In that regard, the side elements 22, 24 may improve optical confinement in the multimode interference region defined by the splitter body 12. The structure 10 may exhibit performance improvements with respect to broadband and back reflection in comparison with conventional optical power splitters. The structure 10 may be more robust than conventional optical power splitters and, in that regard, may be characterized by an improved manufacturing tolerance that is less prone to fabrication imperfections and defects. The structure 10 may meet fabrication constraints set by design rule checks. The curved surfaces of the structure 10 may function to maintain a low insertion loss while minimizing back reflection. The structure 10 may be used in applications such as signal routing, microwave photonics, modulation, etc.

Figure 3:
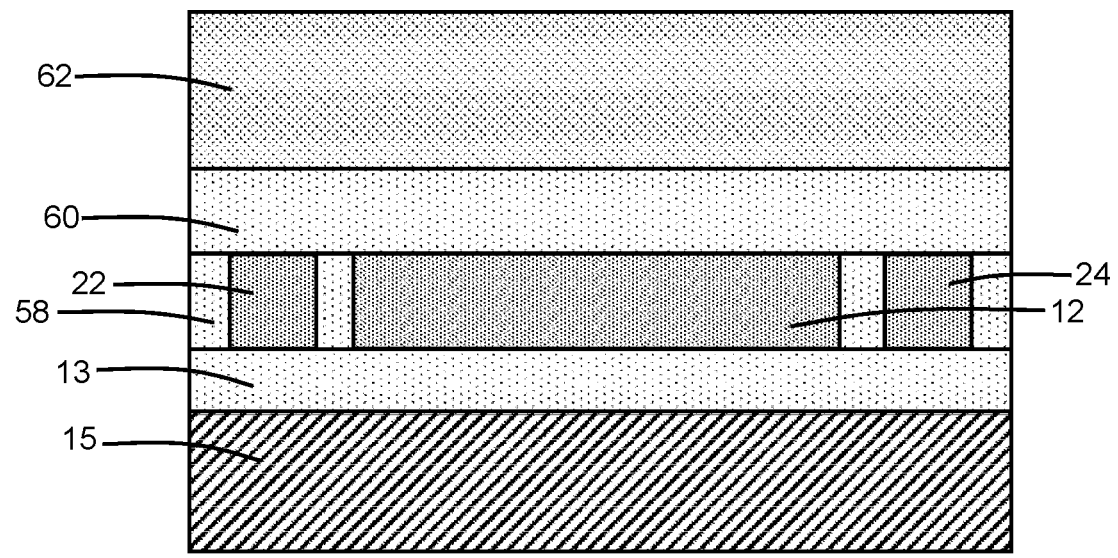
FIG. 3 is a cross-sectional view of the structure at a fabrication stage of the processing method subsequent to FIG. 2.

With reference to FIG. 3 in which like reference numerals refer to like features in FIG. 2 and at a subsequent fabrication stage, a dielectric layer 58 is deposited and planarized to fill the spaces surrounding the splitter body 12, side elements 22, 24, bridges 26, 28, and waveguide cores 40, 42, 44. The dielectric layer 58 may be comprised of dielectric material, such as silicon dioxide, that is deposited and planarized to eliminate topography. A dielectric layer 60 is formed by middle-of-line processing over the dielectric layer 58. The dielectric layer 60 may be comprised of dielectric material, such as silicon dioxide, deposited by chemical vapor deposition using ozone and tetraethylorthosilicate (TEOS) as reactants.

A back-end-of-line stack 62 may be formed by back-end-of-line processing over the dielectric layer 60. The back-end-of-line stack 62 may include one or more interlayer dielectric layers comprised of one or more dielectric materials, such as a silicon dioxide.

The structure 10, in any of its embodiments described herein, may be integrated into a photonics chip that may include electronic components and additional optical components in addition to the structure 10 and waveguide cores 40, 42, 44. The electronic components may include, for example, field-effect transistors that are fabricated by CMOS processing using the device layer of the SOI substrate.

In use, laser light may be guided on the photonics chip by the waveguide core 40 from, for example, a fiber coupler or a laser coupler to the structure 10. The laser light is transferred by the multimode interference region defined by the splitter body 12 in a distributed manner to the waveguide cores 42, 44. Specifically, the optical power of the laser light is divided or split by the structure 10 into different fractions or percentages that are transferred from the waveguide core 40 to the different waveguide cores 42, 44. The optical power of the laser light may be split equally or split substantially equally if the waveguide cores 42, 44 are symmetrically arranged with respect to the longitudinal axis 30 of the splitter body 12 and the waveguide core 40. Alternatively, the coupling ratio may be customized to differ from an equal or substantially equal split by asymmetrically arranging the waveguide cores 42, 44 with respect to the longitudinal axis 30 of the splitter body 12 and the waveguide core 40. The side elements 22, 24 operate to optically confine the light within the splitter body 12 by reflecting light back into the splitter body 12 and to thereby reduce loss to the low-index materials in the environment surrounding the splitter body 12. The waveguide cores 42, 44 separately guide the split laser light away from the structure 10. The spacing between the waveguide cores 42, 44 may increase downstream from the structure 10 to eliminate interaction and crosstalk. Alternatively, the structure 10 may be used to combine the optical power of laser light received from the waveguide cores 42, 44 for output by the waveguide core 40 to, for example, a photodetector or an optical modulator.

Figure 4:
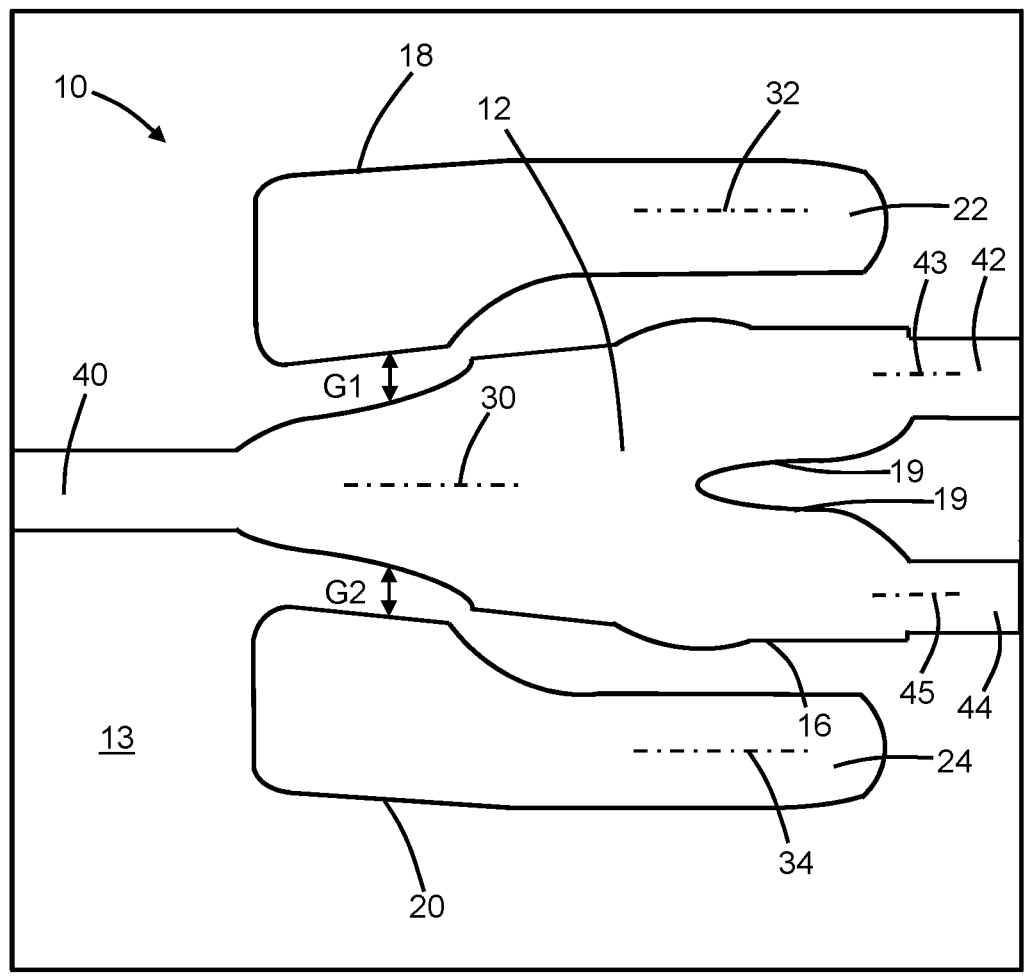
FIG. 4 is a top view of a structure in accordance with alternative embodiments of the invention.

With reference to FIG. 4 and in accordance with alternative embodiments of the invention, the structure 10 may be modified to eliminate the bridges 26, 28 such that the side elements 22, 24 are disconnected from the splitter body 12. Instead, the side element 22 is spaced in its entirety from the side surface 14 of the splitter body 12 by a gap, G1, and the side element 24 is spaced in its entirety from the side surface 16 of the splitter body 12 by a gap, G2. The side surface 18 of the side element 22 extends uninterrupted about the entire perimeter of the side element 22 due to the absence of the bridge 26. The side surface 20 of the side element 24 extends uninterrupted about the entire perimeter of the side element 24 due to the absence of the bridge 28. In alternative embodiments, the bridge 26 may be necked such that a bridged connection persists between the side element 22 and the splitter body 12, but the bridge 26 may be narrowed such that the curved side surfaces 27 are in closer proximity. In alternative embodiments, the bridge 28 may be necked such that a bridged connection persists between the side element 24 and the splitter body 12, but the bridge 28 may be narrowed such that the curved side surfaces 29 are in closer proximity.

The dimensions of the structure 10 may be contingent upon the etching process associated with its patterning. The structure 10 may be tolerant of over-etching or under-etching. If over-etched, one or both of the bridges 26, 28 may be eliminated such that the side element 22 and/or the side element 24 are disconnected from the splitter body 12. If under-etched, the dimensions of the splitter body 12, side elements 22, 24, and bridges 26, 28 may be increased within the confines of approximately the same footprint. However, the side elements 22, 24 may improve optical confinement in the multimode interference region independent of either being physically connected to the splitter body 12 or being physically disconnected from the splitter body 12.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical power splitter, the structure comprising:
 a splitter body defining a multimode interference region of the optical power splitter, the splitter body having a longitudinal axis, a first side surface, and a second side surface opposite from the first side surface, and the first side surface and the second side surface of the splitter body include curved portions;
 a first output waveguide physically coupled to a first portion of the splitter body;
 a second output waveguide physically coupled to a second portion of the splitter body;
 an input waveguide physically coupled to a third portion of the splitter body;
 a first side element positioned adjacent to the first side surface of the splitter body; and
 a second side element positioned adjacent to the second side surface of the splitter body,
 wherein the third portion of the splitter body is spaced along the longitudinal axis from the first portion and the second portion of the splitter body, and the splitter body is laterally positioned in a direction transverse to the longitudinal axis between the first side element and the second side element.

2. The structure of claim 1 wherein the first side element has a first longitudinal axis aligned substantially parallel to the longitudinal axis of the splitter body, and the second side element has a second longitudinal axis aligned substantially parallel to the longitudinal axis of the splitter body.

3. The structure of claim 1 further comprising:
 a first bridge physically coupling a portion of the first side element with the first side surface of the splitter body.

4. The structure of claim 3 further comprising:
 a second bridge physically coupling a portion of the second side element with the second side surface of the splitter body.

5. The structure of claim 3 wherein the first bridge has a longitudinal axis, a first dimension parallel to the longitudinal axis, and a second dimension orthogonal to the first dimension, and the first dimension and the second dimension are each equal to about 0.05 times to about 0.5 times a wavelength of light being split by the optical power splitter.

6. The structure of claim 3 wherein the first bridge includes a first curved side surface and a second curved side surface that physically couple the portion of the first side element and the first side surface of the splitter body.

7. The structure of claim 3 wherein the first bridge has a longitudinal axis, and the longitudinal axis of the first bridge is aligned at a first angle relative to the longitudinal axis of the splitter body.

8. The structure of claim 7 wherein the first side element has a longitudinal axis, and the longitudinal axis of the first bridge is aligned at a second angle relative to the longitudinal axis of the first side element.

9. The structure of claim 3 wherein the first side element has a longitudinal axis, the first bridge has a longitudinal axis, and the longitudinal axis of the first bridge is aligned at an angle relative to the longitudinal axis of the first side element.

10. The structure of claim 3 wherein the first bridge is positioned closer to the input waveguide than to the first output waveguide, and the first bridge is positioned closer to the input waveguide than to the second output waveguide.

11. The structure of claim 1 wherein the first side element is physically disconnected from the splitter body.

12. The structure of claim 11 wherein the second side element is physically disconnected from the splitter body.

13. The structure of claim 1 wherein the splitter body, the input waveguide, the first output waveguide, the second output waveguide, the first side element, and the second side element comprise single-crystal silicon.

14. The structure of claim 1 wherein the first portion of the splitter body includes a first curved surface, and the second portion of the splitter body includes a second curved surface that joins the first curved surface to define a concavity in the splitter body that is laterally positioned in the splitter body between the first output waveguide and the second output waveguide.

15. The structure of claim 14 wherein the concavity in the splitter body is aligned along the longitudinal axis of the splitter body with the third portion of the splitter body.

16. A method of forming a structure for an optical power splitter, the method comprising:
 forming a splitter body defining a multimode interference region of the optical power splitter, wherein the splitter body has a longitudinal axis, a first side surface, and a second side surface opposite from the first side surface, and the first side surface and the second side surface of the splitter body include curved portions;
 forming a first output waveguide that is physically coupled to a first portion of the splitter body;
 forming a second output waveguide that is physically coupled to a second portion of the splitter body;
 forming an input waveguide that is physically coupled to a third portion of the splitter body;
 forming a first side element positioned adjacent to the first side surface of the splitter body; and
 forming a second side element positioned adjacent to the second side surface of the splitter body,
 wherein the third portion of the splitter body is spaced along the longitudinal axis from the first portion and the second portion of the splitter body, and the splitter body is laterally positioned in a direction transverse to the longitudinal axis between the first side element and the second side element.

17. The method of claim 16 further comprising:
 forming a bridge physically coupling a portion of the first side element with the first side surface of the splitter body.

18. The method of claim 17 wherein the bridge includes a first curved side surface and a second curved side surface that physically couple the portion of the first side element and the first side surface of the splitter body.

19. The method of claim 17 wherein the first side element has a longitudinal axis, the bridge has a longitudinal axis, the longitudinal axis of the bridge is aligned at a first angle relative to the longitudinal axis of the splitter body, and the longitudinal axis of the bridge is aligned at a second angle relative to the longitudinal axis of the first side element.

20. The method of claim 16 wherein the first side element and the second side element are physically disconnected from the splitter body.

\* \* \* \* \*